US012699594B2

(12) United States Patent
Subbiah et al.

(10) Patent No.: US 12,699,594 B2
(45) Date of Patent: Aug. 4, 2026

(54) INTELLIGENT PROCESSING OF TASKS IN AN ELASTIC CLOUD APPLICATION

(71) Applicant: SAP SE, Walldorf (DE)

(72) Inventors: Sivaram Subbiah, Bangalore (IN); Varun Rao, Bangalore (IN); Raghavendra Nataraj, Bangalore (IN); Anoop Kumar, Bangalore (IN); Akash H R, Bangalore (IN); Saba Samrin, Ranchi (IN); Ranjit Alapati, Vijayawada (IN)

(73) Assignee: SAP SE, Walldorf (DE)

( * ) Notice: Subject to any disclaimer, the term of this patent is extended or adjusted under 35 U.S.C. 154(b) by 1175 days.

(21) Appl. No.: 17/532,296

(22) Filed: Nov. 22, 2021

(65) Prior Publication Data

US 2023/0161628 A1     May 25, 2023

(51) Int. Cl.
*G06F 9/50* (2006.01)

(52) U.S. Cl.
CPC ............ *G06F 9/5038* (2013.01); *G06F 9/505* (2013.01); *G06F 9/5055* (2013.01)

(58) Field of Classification Search
CPC ........ G06F 9/50; G06F 9/5005; G06F 9/5011; G06F 9/5022
See application file for complete search history.

(56) References Cited

U.S. PATENT DOCUMENTS

| | | | | |
|---|---|---|---|---|
| 9,575,634 | B2 * | 2/2017 | Goodson | ............. G06F 9/44521 |
| 10,198,289 | B2 * | 2/2019 | Rehana | .................... G06F 9/451 |
| 11,163,606 | B1 * | 11/2021 | Hampton | ................ G06F 9/505 |
| 2012/0290707 | A1 * | 11/2012 | Ennis | ...................... H04L 43/10 709/224 |

* cited by examiner

*Primary Examiner* — Andy Ho
(74) *Attorney, Agent, or Firm* — Fountainhead Law Group, PC

(57) ABSTRACT

Computer-readable media, methods, and systems are disclosed for optimizing processing across a plurality of processing resources using one or more leader threads to assign processing tasks to available processing threads across a plurality of application instances. The one or more leader threads monitor the status and availability of the processing threads and a processing load across the plurality of application instances to efficiently assign processing tasks and distribute the processing load across the processing threads of the application instances.

20 Claims, 4 Drawing Sheets

400

RECEIVE A PROCESS
DATA OBJECT                          402

MONITOR PROCESSING LOAD              404

ASSIGN FIRST PROCESSING TASK         406

MONITOR STATUS OF
PROCESS DATA OBJECT                  408

ASSIGN SECOND PROCESSING
TASK                                 410

INTELLIGENT PROCESSING OF TASKS IN AN ELASTIC CLOUD APPLICATION

BACKGROUND

Cloud-based resources may be used to provide processing operations for long running batch jobs. Some cloud-based applications are able to scale up to handle increased processing loads. However, merely scaling the number of application instances fails to accommodate long running batch jobs which include an ordered sequence of processing steps. Accordingly, as the processing load increases it becomes difficult to balance the processing load across the scaled-up application instances.

Another issue with cloud-based resources is managing access to various steps within a long running batch job. Accordingly, steps may be unnecessarily repeated or executed out of order such that processing errors occur.

SUMMARY

Embodiments solve the above-mentioned problems by providing systems, methods, and computer-readable media for optimizing processing across a plurality of processing resources using one or more leader threads to assign processing tasks to available processing threads across a plurality of application instances. The one or more leader threads monitoring the status and availability of the processing threads and a processing load across the plurality of application instances in order to assign processing tasks to the processing threads such that the processing load is efficiently distributed.

Some embodiments are directed to computer-readable media, methods, and systems for optimizing processing across a plurality of resources, comprising receiving a process data object comprising a plurality of processing steps; monitoring, using one or more leader threads, a current processing load across a plurality of application instances; assigning, using the one or more leader threads, a first processing task corresponding to a first step of the plurality of processing steps to a first processing thread within one of the plurality of application instances based on the current processing load; and upon completion of the first processing task, assigning, using the one or more leader threads, a second processing task corresponding to a second step of the plurality of processing steps to a second processing thread within one of the plurality of application instances based on the current processing load.

Additional embodiments are directed to a method for locking a processing step to a specific processing thread of a plurality of processing threads such that only the specific processing thread has access to the processing step. Locking information indicative of the lock may be stored in a lock table on a persistence data store for retrieval by one or more leader threads when assigning a processing task.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the disclosure will be apparent from the following detailed description of the embodiments and the accompanying drawing figures.

BRIEF DESCRIPTION OF THE DRAWING FIGURES

Embodiments are described in detail below with reference to the attached drawing figures, wherein.

Figure 1:
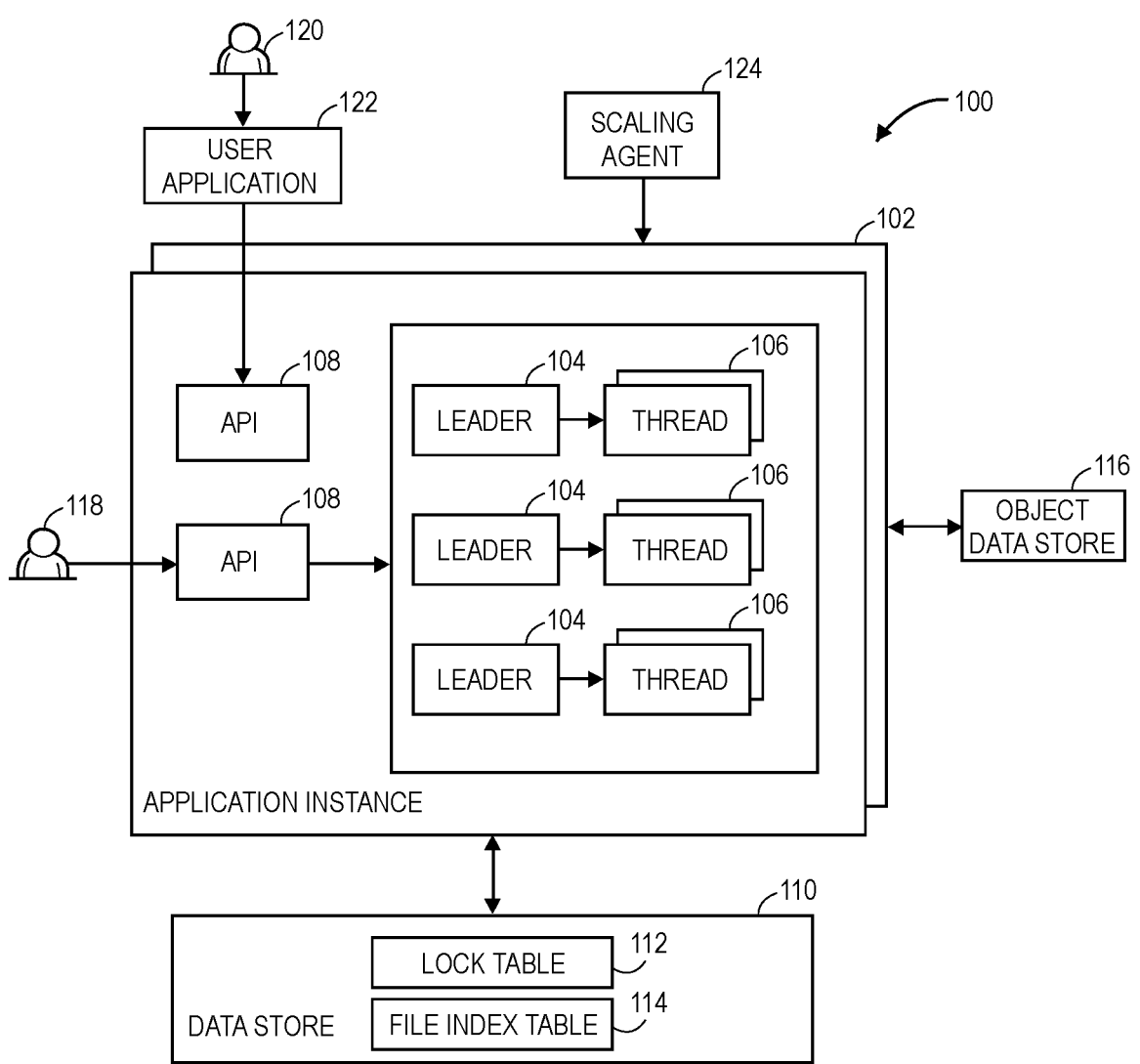
FIG. 1 depicts an exemplary system diagram of a processing optimization system relating to some embodiments.

The drawing figures do not limit the disclosure to the specific embodiments disclosed and described herein. The drawings are not necessarily to scale, emphasis instead being placed upon clearly illustrating the principles of the present teachings.

DETAILED DESCRIPTION

The following detailed description references the accompanying drawings that illustrate specific embodiments in which the present teachings can be practiced. The embodiments are intended to describe aspects of the disclosure in sufficient detail to enable those skilled in the art to practice the present teachings. Other embodiments can be utilized and changes can be made without departing from the scope of the disclosure. The following detailed description is, therefore, not to be taken in a limiting sense. The scope of the present teachings is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Turning first to FIG. 1, an exemplary system diagram of a processing optimization system 100 is depicted relating to some embodiments. In some embodiments, the system 100 comprises a plurality of application instances 102. Accordingly, in some such embodiments, each application instance 102 comprises one or more leader threads 104 and a plurality of processing threads 106. In some embodiments, each leader thread 104 may be associated with a respective plurality of processing threads 106, as shown. Here, each leader thread 104 may distribute and assign processing tasks among the plurality of processing threads 106 associated with that particular leader thread 106.

In some embodiments, the system 100 may be a cloud-based processing system which comprises one or more remote processing or remote storage resources. Accordingly, embodiments are contemplated in which one or more of the application instances 102 may be remotely stored or executed on a remote server. In some such embodiments, communications between the components of system 100 may be carried out over a wired or wireless network. Further, in some embodiments, the application instances 102 may be provided within a cluster, such as on nodes of a Kubernetes cluster. Accordingly, the plurality of application instances 102 may be communicatively coupled within said cluster.

In some embodiments, each leader thread 104 may be associated with every processing thread in the plurality of processing threads 106 such that any leader thread may assign processing tasks to a given processing thread. Further, embodiments are contemplated in which a single leader thread 104 may be included such that the single leader thread assigns processing tasks to the plurality of processing threads 106. In some embodiments, a single leader thread 104 may be included for each application instance 102 such that each application instance has its own leader thread 104 for assigning processing tasks to the plurality of processing threads 106 on that application instance 102. Alternatively, embodiments are contemplated in which a single leader thread 104 may be included for all application instances 102 such that the leader thread can, for example, assign processing tasks to a first processing thread in a first application instance and assign processing tasks to a second processing thread in a second application instance.

In some embodiments, the application instance 102 further comprises one or more Application Programming Interfaces (APIs) 108 which may be API endpoints operable to communicate with external applications and resources, as will be described in further detail below. Alternatively, in some embodiments, various communications may be made directly or natively such that APIs 108 are not used. In some embodiments, the application instance 102 may be communicatively coupled to a persistence data store 110. The persistence data store 110 may comprise a lock table 112 and a file index table 114. In some embodiments, the lock table 112 stores information for locking one or more of the plurality of processing threads 106. In some embodiments, the file index table 114 stores information relating to one or more files processed by the plurality of application instances 102. In some embodiments, persistence information may be stored in the persistence data store 110. For example, the leader thread 104 may store information relating to the processing status of a process data object or file in the persistence data store 110. Further, in some embodiments, the persistence data store 110 may store information relating to each application instance in the plurality of application instances 102 such that the application instances can interact through the persistence data store 110. Further still, embodiments are contemplated in which a plurality of separate persistence data stores may be included. For example, in some embodiments, a first persistence data store stores the lock table 112 and a second persistence data store stores the file index table 114.

In some embodiments, the system 100 further comprises an object data store 116 which may be communicatively coupled to the application instance 102. In some embodiments, the object data store 116 may be an external data store remote from the system 100. Alternatively, in some embodiments, the object data store 116 may be included within the system 100. Further, in some embodiments, multiple object data stores may be included. For example, a first object data store may be included within the system 100 while a second object data store is remotely located. In some embodiments, the object data store 116 may store data corresponding to a plurality of data objects. For example, in some embodiments, objects may be generated representing each of a plurality of batch processes, such that information associated with a given batch process may be stored within an object on the object data store 116. Further, in some embodiments, each batch process may be associated with a unique identifier for identifying that particular process within the system 100. Accordingly, in some embodiments, the unique identifier may be stored in the object on the object data store

116. Alternatively, embodiments are contemplated in which the object data store 116 may be combined with or included as part of the persistence data store 110.

In some embodiments, one or more users may interact with the application instances 102. For example, in some embodiments, a first user 118 may interact with a given application instance 102 via API 108, as shown. Here, the first user 118 may be an operator of a user device associated with the application instance 102. In some embodiments, the first user 118 may provide a process data object comprising one or more processing steps to be performed by the plurality of processing threads 106. Further, in some embodiments, a second user 120 may log in through an external user application 122 and interact with the application instance 102 through yet another API 108, as shown. Here, the second user 120 may be a standard user providing one or more files to be processed by the system 100 where a plurality of processing steps is completed for each of the one or more files. Accordingly, in some embodiments, the one or more files may be received into the application instance 102 through the API 108. In some embodiments, the one or more files or information indicative of the one or more files may be stored in the file index table 114 in the persistence data store 110. The leader threads 104 may monitor the processing load across the system 100 and distribute processing tasks across the plurality of processing threads accordingly.

In some embodiments, a number of application instances in the plurality of application instances 102 may be elastic such that application instances may be added or removed, for example, based on the processing load. Here, if processing resources such as the processing threads of the application instances are occupied with processing tasks additional application instances may be added to increase the overall number of processing resources. In some embodiments, the number of application instances may be scaled using a scaling agent, as will be described in further detail below.

In some embodiments, a scaling agent 124 may be included for scaling the number of application instances 102 which are running. Accordingly, the scaling agent 124 is operable to open new application instances or close out of application instances based on information received from the leader threads 104. For example, in some embodiments, the leader threads 104 may provide processing status information to the persistence data store 110 which may be accessible by the scaling agent 124 such that the scaling agent 124 can adjust the number of application instances accordingly. Alternatively, embodiments are contemplated in which the leader thread 104 transmits processing status information directly to the scaling agent 124. In some embodiments, the processing status information may comprise information relating to any of the number of files to be processed, the current status of processing files, the number of available processing threads 106, a queue of currently pending process data objects, and other information relating to the processing files and the resources of the system 100.

In some embodiments, a scaling request may be transmitted to scaling agent 124 for scaling a number of application instances in the plurality of application instances 102. In some embodiments, the scaling request may be transmitted based on the processing load monitored by the leader thread 104. For example, if it is determined that all of the processing threads are occupied, a scaling request may be transmitted to increase the number of application instances. Further, in some embodiments, a scaling request may be transmitted based on a determination that a certain ratio of the processing threads are occupied. Further still, in some embodiments, the current queue of processing tasks and process data object instances may be considered before submitting a scaling request. For example, a large number of process data object instances are queued for processing and the available number of processing threads is not sufficient to accommodate the queued processing steps a scaling request may be transmitted to increase the number of application instances.

Figure 2:
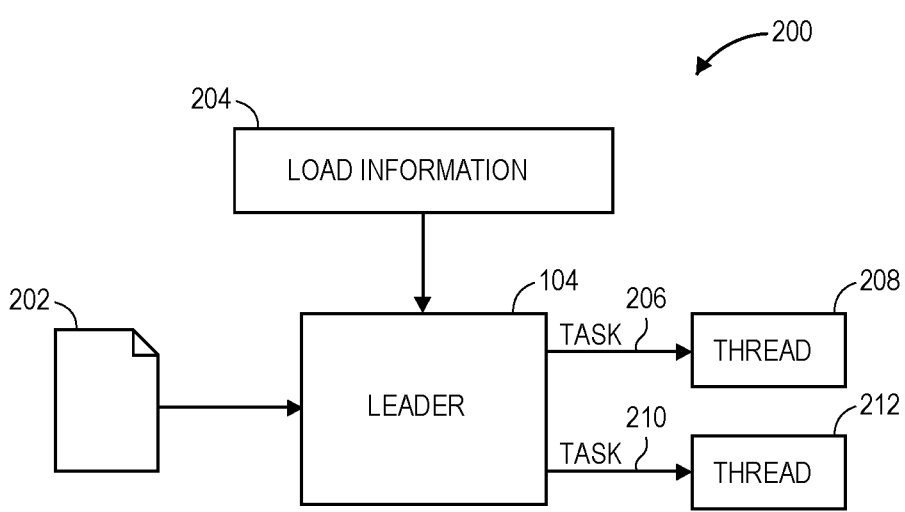
FIG. 2 depicts an exemplary system diagram of a system for distributing processing relating to some embodiments.

Turning now to FIG. 2, an exemplary system diagram of a system 200 for distributing processing is depicted relating to some embodiments. In some embodiments, a process data object 202 may be received by the leader thread 104. Alternatively, in some embodiments, the process data object 202 may not be directly received by the leader thread 104. Instead, the leader thread 104 may receive a notification indicative of the process data object 202. For example, the leader 104 may receive a notification indicating the number of processing steps of the process data object 202. Further, embodiments are contemplated in which the leader thread 104 receives multiple process data objects 202. For example, in some embodiments, a plurality of process data objects 202 may be executed simultaneously. In some embodiments, the leader thread 104 also receives processing load information 204. For example, in some embodiments, the processing load information 204 may be accessed from the persistence data store 110. For example, the processing load information 204 may comprise the processing status information, as described above. In some embodiments, the leader thread 104 uses the processing load information 204 to monitor the availability of the plurality of processing threads 106.

In some embodiments, the leader thread 104 assigns a first processing task 206 corresponding to a first processing step of the process data object 202 based on the received processing load information 204. Here, the leader thread 104 may assign the first processing task 206 to a first processing thread 208 of the plurality of processing threads 106. In some embodiments, the processing task 206 may be assigned to the first processing thread 208 based on determining that the first processing thread 208 is available based on the processing load information 204. Further, in some embodiments, the leader thread 104 may assign a second processing task 210 corresponding to a second processing step of the process data object 202 to a second processing thread 212 based on the processing load information 204. Here, the second processing task 210 may be assigned in response to determining that the second processing thread 212 is available.

In some embodiments, each of the first processing thread 208 and the second processing thread 212 are part of the same application instance 102. Alternatively, in some embodiments, the first processing thread 208 may be part of a first application instance and the second processing thread 212 may be part of a distinct second application instance. Accordingly, the leader thread 104 may be operable to optimize processing by distributing processing tasks across the plurality of processing threads 106 on the respective plurality of application instances 102 based on the processing load information 204.

Figure 3:
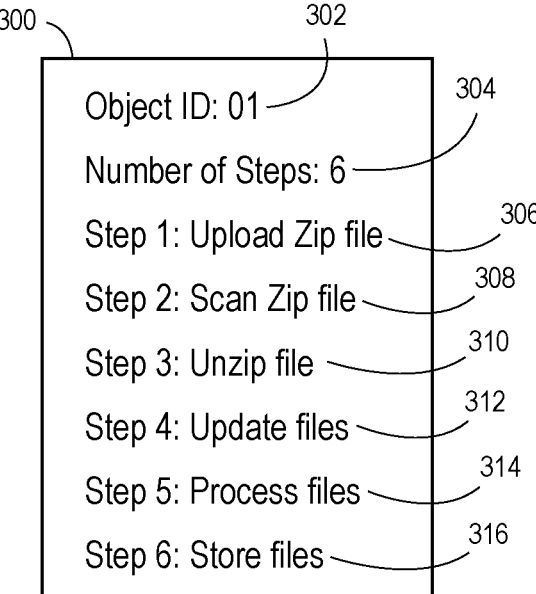
FIG. 3 depicts an exemplary process data object relating to some embodiments.

Turning now to FIG. 3, an exemplary process data object 300 is depicted relating to some embodiments. In some embodiments, the exemplary process data object 300 is a data object comprising a plurality of processing steps to be performed by the system 100. In some embodiments, the process data object 300 is received by the system 100, for example, via API 108. In some embodiments, the process data object 300 may comprise metadata such as an object identifier 302 and a step count indicator 304, as shown.

Accordingly, the object identifier 302 may be a unique identifier to identify the process data object 300 among a plurality of other process data objects processed by the system 100. For example, the object identifier 302 may be used by the object data store 116 to identify the process data object 300. In some embodiments, the step count indicator 304 may be used to indicate the number of processing steps in the process data object 300.

In some embodiments, the process data object 300 comprises a plurality of processing steps to be processed by one or more of the plurality of processing threads 106. For example, a first processing step 306 may be included for uploading a zip file. Here, a zip file associated with the process data object 300 may be uploaded, for example, in some embodiments, the zip file may be uploaded to the object data store 116. Alternatively, in some embodiments, a zip file may be uploaded to an external application or external data store. In some embodiments, a second processing step 308 may be included, for example, to scan the zip file for viruses. A third processing step 310 may be included, for example, to unzip the zip file. Here, a corresponding processing task for the third processing step 310 may include a file decompression technique. A fourth processing step 312 may be included, for example, to update one or more files, tables, or other data structures based on the unzipped file. A fifth processing step 314 may be included, for example, to process one or more files. A sixth processing step 316 may be included, for example, to store one or more files. For example, in some embodiments, the files processed at step 314 may be stored at step 316.

In some embodiments, one or more files may be generated or updated based on the plurality of steps. For example, embodiments are contemplated in which the plurality of processing steps comprises receiving (or generating) one or more excel-based XLS sheet files or a CSV file. Further, embodiments are contemplated in which at least one of the processing steps includes converting a file from a first file type to a second file type. Additionally, steps may be included for transforming or editing a data set within a file. Further still, in some embodiments, the exemplary process data object 300 may be just one instance of a given process data object. For example, multiple instances of the same process data object may be running in the system 100 simultaneously. In some embodiments, a first instance of the data process object is executed for a first file while a second instance of the data process object is executed for a second file.

In some embodiments, the processing threads may be able to act similarly to the leader thread 104 and break a given processing task into a plurality of processing subtasks, for example, based at least in part on a complexity of the processing task. Accordingly, in such embodiments, a processing thread may assign each processing subtask of a received processing task to another available processing thread or to a processing sub-thread. Here, for example, each processing thread may be associated with a plurality of processing sub-threads. Accordingly, embodiments are contemplated in which any number of levels of processing hierarchy may be included such that a first level corresponds to the leader threads, a second level corresponds to the processing threads, and a third level corresponds to processing sub-threads.

In one exemplary scenario, a process data object may be provided for processing a CSV file. Accordingly, a CSV file may be received including a substantially large number of entries. To handle the large number of entries, a processing thread assigned with a task of processing the entries may distribute at least a portion of the processing to one or more other processing threads such that the processing of the entries can be carried out in parallel to reduce the overall processing time. Alternatively, the processing thread may assign processing of the entries to a plurality of sub-threads associated with the processing thread, as described above. In some embodiments, the determination as to whether to break a complex processing task into subtasks may be made by the processing thread or the leader thread 104. Alternatively, embodiments are contemplated in which instructions to generate subtasks may be preconfigured into the process data object.

Embodiments are contemplated in which one or more of the processing threads of the plurality of processing threads 106 are specialized processing threads for performing specific types of processing steps. For example, a replication thread may be included for replicating data, an unzipping thread may be included for unzipping zip files, and a storage thread may be included for storing files. Accordingly, in such embodiments, the leader thread 104 may assign processing tasks based on the specializations of the processing threads. For example, a replication task may be assigned to a replication thread. In some embodiments, specialization of the processing threads improves the efficiency of the processing tasks.

In some embodiments, each of the plurality of processing steps is organized into a specific order within the process data object. Accordingly, for example, the second step cannot be performed before the first step and the third step cannot be performed before the second step. Here, the steps may be a specific sequence of steps in which each step relies on information from the previous steps. Accordingly, in some embodiments, the leader thread 104 may monitor the status and progress of the processing steps to ensure that the steps are performed in the proper order and are not repeated to avoid processing errors.

processing data objects may be included for performing various different processing operations. Further, a second column may include a step indicator indicating the step which is currently being processed of the plurality of processing steps. Additionally, a unique processing thread identifier or "ThreadID" may be included identifying which processing thread is currently processing the processing step or which processing thread has access to the processing step. Accordingly, embodiments are contemplated in which the unique processing thread identifier is stored along with a set of data for the process data object on either of the persistence data store 110 or the object data store 116.

In some embodiments, the data table may include a column for creation time indicating the time at which the processing task started or was created. Further, the data table may include a column for expiration time indicating a time at which the processing task should expire. In some embodiments, the expiration time may be determined based on the creation time. For example, in some embodiments, the expiration time may be calculated as the creation time plus fifteen minutes or some other predetermined time duration. Further, in some embodiments, the predetermined time duration may be determined based on the type of processing step to which the processing task relates. For example, in some embodiments, a first processing step may take longer to complete than a second processing step. Accordingly, the expiration time for the first processing step may be greater than that of the second processing step.

Embodiments are contemplated in which a machine learning algorithm may be included for determining the expiration time based on a historical time to complete similar processing tasks. For example, the machine learning algorithm may be trained with historical processing task data such that the algorithm can accurately estimate the typical time needed to complete a specific task. Accordingly, the machine learning algorithm will improve over time and

TABLE 1

| ObjectID | Action | AppInstance ID | ThreadID | createdAt | ExpiringBy |
|---|---|---|---|---|---|
| O1 | Step1 | Instance-1f3812d71-582d-4bbf-82d3-f816e535c0a4 | Worker-17334e55c-e064-45b5-9d9d-73a8c45d31be | 7-Sep-2021:08:00:00 | 7-Sep-2021:08:15:00 |
| O2 | Step2 | Instance-4634c6e4c-72f6-403f-b6f8-4367ec8b0f9b | Worker-3e51ad067-7004-4142-b3a8-37cd2ac9323e | 7-Sep-2021:07:12:00 | 7-Sep-2021:07:18:00 |

Table 1 depicted above shows an exemplary data table for keeping track of processing data objects relating to some embodiments. For example, in some embodiments, the data table may be stored within the object data store 116 or the persistence data store 110. In some embodiments, for example, in which the object data store 116 is an external data store the data table may be stored within the persistence data store 110 to avoid data protection and privacy issues associated with external data storage. In some embodiments, a first column of the table may include an object identifier, as shown, for identifying the processing data object. In some embodiments, each object identifier represents a unique instance of a respective processing data object. In some embodiments, multiple identical instances of a processing data object may be included. Alternatively, or additionally, in some embodiments, a plurality of different types of adapt to the specific types of processing tasks that are present. Further, in some embodiments, the machine learning model may consider other factors such as the number of subtasks and still other factors relating to the processing task. In some such embodiments, the machine learning algorithm may be included within the system 100. Alternatively, in some embodiments, the machine learning model may be external to the system 100 but communicatively coupled to at least a portion of the system 100. In some embodiments, the machine learning model may access either of the persistence data store 110 or the object data store 116 to determine expiration time or to retrieve training data.

In some embodiments, once the expiration time has exceeded for a given processing step the processing task may be reassigned to another processing thread of the plurality of processing threads 106. Accordingly, if a processing thread becomes stuck on a certain processing task, for example, due to a processing error, the task may be reassigned and started over to cure the error and ensure that the task is completed. Additionally, reassigning the processing task frees up processing availability as the initial processing thread becomes available instead of being tied down to the task, which may never complete due to the error. Further, embodiments are contemplated in which more time may be requested by the processing thread after the expiration time has been exceeded.

TABLE 2

| Action Step | Number Of Workers Configured | Lock Validity Time |
|---|---|---|
| Step1 | 10 | 15 minutes |
| Step2 | 5 | 6 minutes |
| Step3 | 8 | 10 minutes |

Table 2 depicted above shows an exemplary persistence data table relating to some embodiments. For example, in some embodiments, the leader thread 104 may retrieve data in the table from the persistence data store 110 to determine the availability of the processing threads. In some embodiments, the persistence data table includes a first column including a step identifier identifying a specific processing step. Additionally, the persistence data table may include a second column indicating the number of processing threads configured to process a given processing step. In some embodiments, the number of processing threads may be determined based on an availability of the respective processing threads. Further, a third column may be included for indicating the lock validity time for a given processing step. In some embodiments, the expiration time in Table 1 may be determined based on the lock validity time in Table 2. For example, in some embodiments, the lock validity time from Table 2 may be added to the creation time of Table 1 to determine the expiration time.

TABLE 3

| ActionStep | WorkerThread | ObjectID |
|---|---|---|
| Step1 | 7334e55c-e064-45b5-9d9d-73a8c45d31be | O1 |
| Step4 | a312bf2e-a25f-4a7c-96ac-ff32a6b6570a | O8 |

Table 3 depicted above shows an exemplary assignment data table relating to some embodiments. In some embodiments, the assignment data table may be stored in either of the persistence data store 110 or the object data store 116. In some embodiments, the assignment data table includes information relating to the assignments of various processing steps of processing data objects to specific processing threads. Accordingly, the assignment data table may include a first column indicating the current processing step. Further, the assignment data table may include a processing thread indicator for indicating the specific processing thread which is currently processing the processing task corresponding to the processing step listed in the first column. In some embodiments, the thread indicator may be a unique identifier for the processing thread to identify the processing thread among the plurality of processing threads 106. In some embodiments, the assignment data table further includes a third column with an object identifier for identifying the specific processing data object. In some embodiments, the assignment data table may be used to determine which processing thread has access to a given processing data object or step within a processing data object. In some embodiments, all other processing threads may be locked out or restricted from accessing the processing step listed in the first column.

TABLE 4

| ObjectID | Currentstep | isComplete | isSuccessful |
|---|---|---|---|
| O1 | Step2 | | |
| O2 | Step8 | | |
| O3 | Step4 | | |
| O4 | | True | True |
| O5 | Step3 | True | False |

Table 4 depicted above shows an exemplary action log table relating to some embodiments. In some embodiments, the action log table may be used to monitor a status and to keep track of a plurality of processing steps. In some embodiments, a first column may be included including an object identifier for identifying the processing data object. A second column may be included indicating a current processing step which is currently active (if any are active). A third column may be included indicating whether the steps pf the processing data object are completed. Accordingly, the status of the processing task may be monitored to determine if completed. A fourth column may be included for indicating whether the processing step is successful. For example, it may be determined whether the processing step has been completed successfully. Accordingly, embodiments are contemplated in which one or more return values may be generated indicating successful completion of the processing step. Alternatively, if a given processing task fails, an error message may be generated indicating failure of the task.

Figure 4:
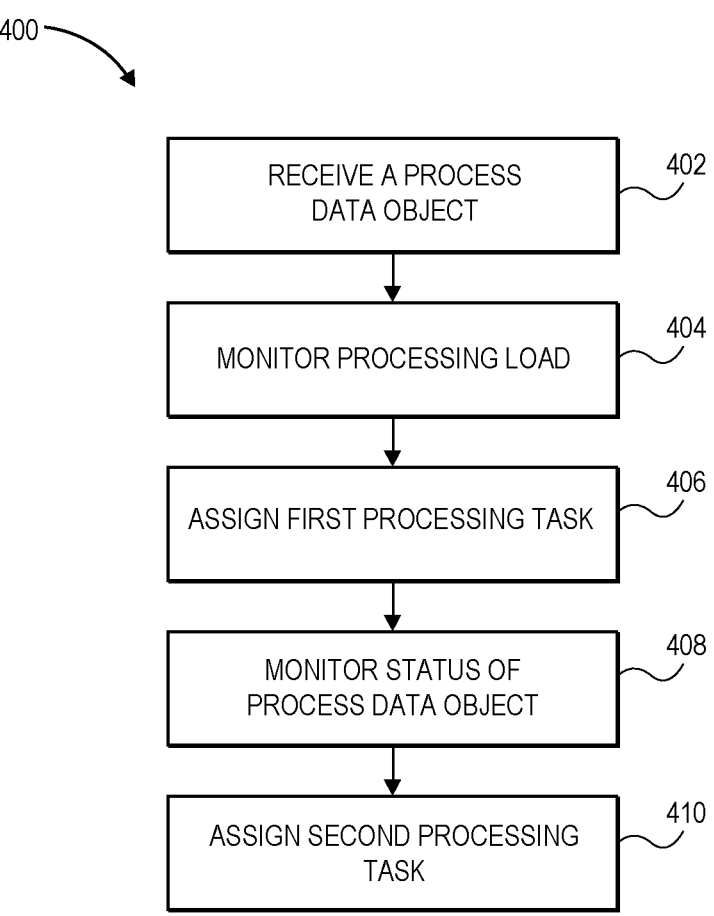
FIG. 4 depicts an exemplary method for processing optimization relating to some embodiments.

Turning now to FIG. 4, a method 400 for optimizing processing is depicted relating to some embodiments. In some embodiments, at least a portion of the steps of the method 400 may be performed on a processor within a component of the system 100. For example, in some embodiments, one or more of the steps of method 400 may be executed on a processor of a server or user device running application instance 102. At step 402 a process data object may be received. In some embodiments, the process data object may be received from an operator user through API 108. Alternatively, in some embodiments, the process data object may be predefined and stored within a data store, such as, for example, persistence data store 110. In some embodiments, the process data object comprises a plurality of processing steps to be executed on one or more of the processing threads.

At step 404 a processing load of the system 100 may be monitored. In some embodiments, the processing load may be monitored using the leader thread 104. Here, the leader thread 104 may receive processing load information 204, as shown in FIG. 2. In some embodiments, monitoring the processing load may include determining a processing status of one or more processing threads and determining a number of items to be processed. For example, in some embodiments, a queue of items to be processed may be generated and stored in the persistence data store 110 to keep track of process data objects and processing steps to be executed. In some embodiments, the leader thread 104 accesses the queue to determine which processing tasks to assign.

At step 406 a first processing task is assigned by the leader thread 104. In some embodiments, the first processing task may be assigned to a processing thread of the plurality of processing threads 106 based on the processing load information 204. In some such embodiments, the processing load information 204 comprises availability information for each of the plurality of processing threads such that the first processing task may be assigned based on a determination that a given processing thread is available. In some embodiments, when the first processing task is assigned, the first processing step may be locked, such that only the processing thread to which the task has been assigned has access to the first processing step. Accordingly, steps are prevented from being unnecessarily repeated by more than one processing thread.

At step 408 a status of the process data object is monitored, for example, using the leader thread 104. In some embodiments, status information may be received from a table within the persistence data store 110 to determine the status. For example, in some embodiments, said table may be periodically updated with status information from the plurality of processing threads 106. Alternatively, embodiments are contemplated in which the processing threads provide status information directly to the leader thread 104. In some embodiments, the status information may include progress information for the process data object instance such as the current step of the plurality of processing steps. Further, embodiments are contemplated in which progress information may be determined for a given processing task based on one or more breakpoints within each processing task. For example, in some embodiments, each processing task may comprise one or more lines of code. Here, in some embodiments, the one or more breakpoints may be embedded within the one or more lines of codes such that the status of the processing thread may be updated based on the progress at each breakpoint of the processing task.

In some embodiments, monitoring the status may also include receiving further processing load information. For example, in some embodiments, a plurality of process data object instances may be queued such that a multiple processing tasks are performed simultaneously on various different processing threads across multiple application instances. Here, the processing load may change between when the first processing task was assigned to when the first processing task is completed. Accordingly, the processing load may be reconsidered before assigning a second processing step.

At step 410 a second processing task corresponding to a second processing step of the plurality of processing steps is assigned by the leader thread 104. In some embodiments, the second processing task may be assigned in response to determining that the first processing task is completed. In some embodiments, the second processing task may be assigned to the same processing thread which processed the first processing task. Alternatively, in some embodiments, the second processing task may be assigned to a second processing thread distinct from the first processing thread. In some embodiments, the second processing task may be assigned based on the processing load. Accordingly, in some embodiments, the processing load may be monitored using the leader thread 104 before assigning each processing task to determine which processing threads of the plurality of processing threads 106 are currently available.

Similar to as described above with respect to the first processing task, in some embodiments, when the second processing task is assigned, the second processing step may be locked such that only the assigned processing thread has access to the second step to prevent steps from being repeated. In some embodiments, the step may be locked by updating a lock table such as lock table 112, as shown in FIG. 1. Alternatively, in some embodiments, the processing step may be locked according to information in Table 3. For example, if the step is assigned to a specific processing thread only that processing thread has access to that step. In some embodiments, the leader thread 104 may assign any number of subsequent processing tasks to available processing threads based on the plurality of steps in the process data object instance. For example, a third processing task based on a third step may be assigned to a processing thread based on the current processing load and availability of said processing thread. In some embodiments, the third processing task may be assigned to the same processing thread which completed either of the first processing task or the second processing task.

Figure 5:
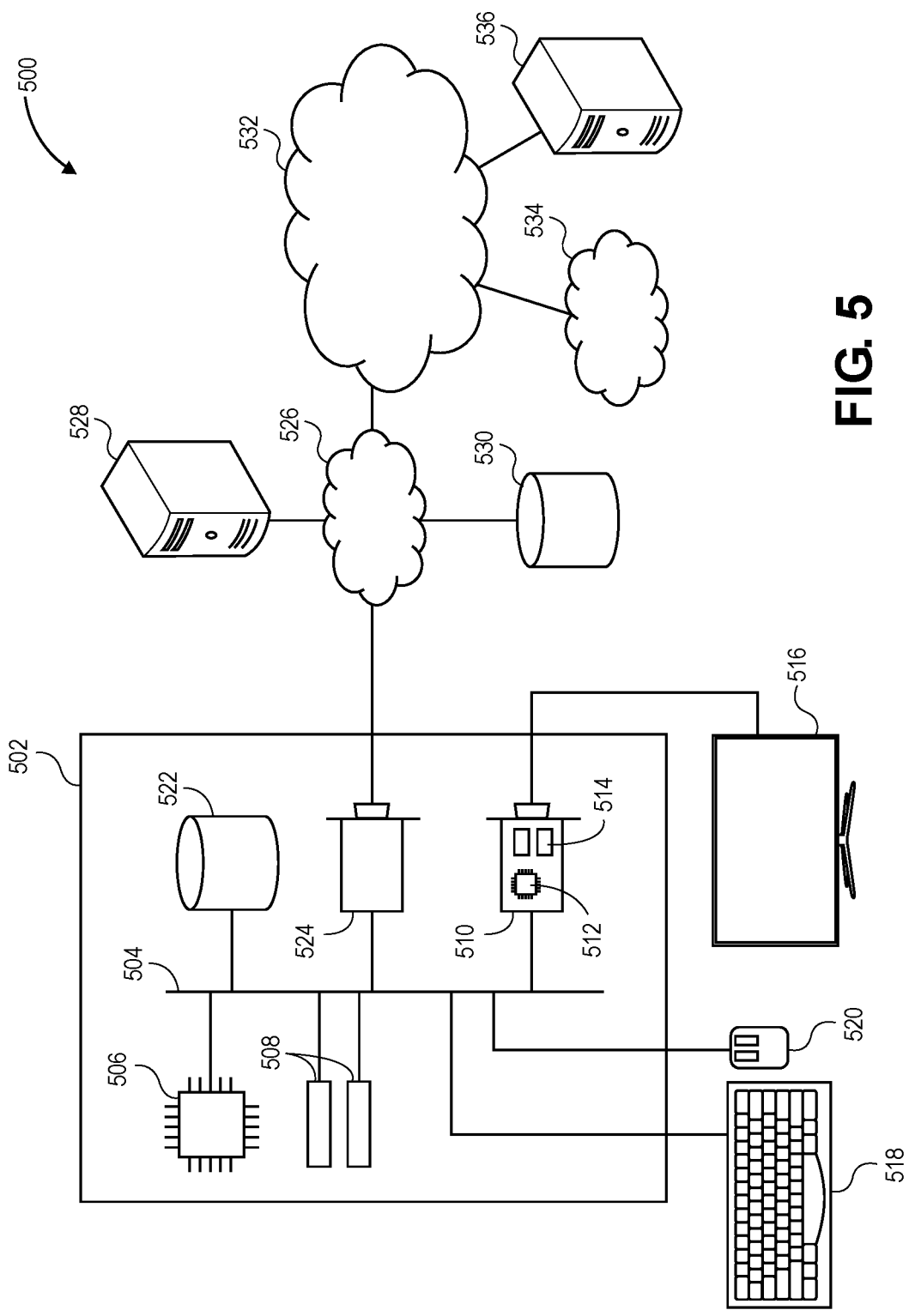
FIG. 5 depicts an exemplary hardware platform relating to some embodiments.

Turning now to FIG. 5, an exemplary hardware platform for certain embodiments is depicted. Computer 502 can be a desktop computer, a laptop computer, a server computer, a mobile device such as a smartphone or tablet, or any other form factor of general- or special-purpose computing device. Depicted with computer 502 are several components, for illustrative purposes. In some embodiments, certain components may be arranged differently or absent. Additional components may also be present. Included in computer 502 is system bus 504, whereby other components of computer 502 can communicate with each other. In certain embodiments, there may be multiple busses or components may communicate with each other directly. Connected to system bus 504 is central processing unit (CPU) 506. Also attached to system bus 504 are one or more random-access memory (RAM) modules 508. Also attached to system bus 504 is graphics card 510. In some embodiments, graphics card 510 may not be a physically separate card, but rather may be integrated into the motherboard or the CPU 506. In some embodiments, graphics card 510 has a separate graphics-processing unit (GPU) 512, which can be used for graphics processing or for general purpose computing (GPGPU). Also on graphics card 510 is GPU memory 514. Connected (directly or indirectly) to graphics card 510 is display 516 for user interaction. In some embodiments no display is present, while in others it is integrated into computer 502. Similarly, peripherals such as keyboard 518 and mouse 520 are connected to system bus 504. Like display 516, these peripherals may be integrated into computer 502 or absent. Also connected to system bus 504 is local storage 522, which may be any form of computer-readable media, and may be internally installed in computer 502 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 524 is also attached to system bus 504 and allows computer 502 to communicate over a network such as network 526. NIC 524 can be any form of network interface known in the art, such as Ethernet, ATM, fiber, Bluetooth, or Wi-Fi (i.e., the IEEE 802.11 family of standards). NIC 524 connects computer 502 to local network 526, which may also include one or more other computers, such as computer 528, and network storage, such as data store 530. Generally, a data store such as data store 530 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 528, accessible on a local network such as local network 526, or remotely accessible over Internet 532. Local network 526 is in turn connected to Internet 532, which connects many networks such as local network 526, remote network 534 or directly attached computers such as computer 536. In some embodiments, computer 502 can itself be directly connected to Internet 532.

In some embodiments, various components of the system 100 and the system 200 may be carried out or hosted on the exemplary hardware platform 500 of FIG. 5. For example, in some embodiments, at least a portion of the application instances 102 may be running on a computer, such as computer 502, 528, or 536. Additionally, in some embodiments, various components of the system 100 may communicate via a network such as the local network 526 or internet 532. Further still, in some embodiments, the users 118 and 120 may utilize a computer such as computer 502 to access the system 100.

Although the present teachings have been described with reference to the embodiments illustrated in the attached drawing figures, it is noted that equivalents may be employed and substitutions made herein without departing from the scope of the present teachings as recited in the claims.

Having thus described various embodiments, what is claimed as new and desired to be protected by Letters Patent includes the following:

1. One or more non-transitory computer-readable media storing computer-executable instructions that, when executed by a processor, perform a method for optimizing processing across a plurality of resources, the method comprising:
    receiving a process data object comprising a plurality of processing steps;
    monitoring, using one or more leader threads, a current processing load across a plurality of application instances;
    assigning, using the one or more leader threads, a first processing task corresponding to a first step of the plurality of processing steps to a first processing thread within one of the plurality of application instances based on the current processing load; and
    upon completion of the first processing task, assigning, using the one or more leader threads, a second processing task corresponding to a second step of the plurality of processing steps to a second processing thread within one of the plurality of application instances based on the current processing load.

2. The computer-readable media of claim 1, further comprising monitoring a status of the first processing task based on persistency data stored in a persistency data store communicatively coupled to the plurality of application instances.

3. The computer-readable media of claim 2, wherein the persistency data comprises expiration information for reassigning the first processing task if an expiration time is exceeded.

4. The computer-readable media of claim 1, further comprising:
    in response to assigning the first processing task, transmitting a lock request to a persistency data store for locking the first step of the plurality of processing steps such that only the first processing thread has access to the first processing step.

5. The computer-readable media of claim 1, further comprising:
    monitoring, using the one or more leader threads, a processing status and a number of items to be processed; and
    transmitting a scaling request to a scaling agent requesting scaling of a number of application instances in the plurality of application instances based on the processing status and the number of items to be processed.

6. The computer-readable media of claim 1, further comprising:
    assigning, using the first processing thread, a plurality of processing subtasks associated with the first processing task based on a complexity of the first step in the plurality of processing steps.

7. The computer-readable media of claim 1, wherein the plurality of application instances is communicatively coupled within a cluster.

8. A method for optimizing processing across a plurality of resources, the method comprising:
    receiving a process data object comprising a plurality of processing steps;
    monitoring, using one or more leader threads, a current processing load across a plurality of application instances;
    assigning, using the one or more leader threads, a first processing task corresponding to a first step of the plurality of processing steps to a first processing thread within one of the plurality of application instances based on the current processing load; and
    upon completion of the first processing task, assigning, using the one or more leader threads, a second processing task corresponding to a second step of the plurality of processing steps to a second processing thread within one of the plurality of application instances based on the current processing load.

9. The method of claim 8, wherein the first processing task is performed on a first application instance of the plurality of application instances and the second processing task is performed on a second application instance of the plurality of application instances.

10. The method of claim 8, further comprising:
    responsive to assigning the first processing task to the first processing thread, updating a status of the process data object within a persistence data store.

11. The method of claim 8, further comprising:
    upon completion of the second processing task, assigning, using the one or more leader threads, a third processing task corresponding to a third step of the plurality of processing steps to a third processing thread within one of the plurality of application instances based on the current processing load.

12. The method of claim 8, wherein the one or more leader threads comprises a single leader thread persisting across each application instance of the plurality of application instances.

13. The method of claim 8, further comprising:

in response to assigning the first processing task, transmitting a lock request to a persistency data store for locking the first step of the plurality of processing steps such that only the first processing thread has access to the first step of the plurality of processing steps.

14. The method of claim 8, wherein each processing step of the plurality of processing steps is performed on a different application instance of the plurality of application instances.

15. A processing optimization system comprising:

a persistence data store;

a plurality of application instances, each application instance of the plurality of application instances associated with a set of processing threads;

one or more leader threads associated with the plurality of application instances;

a scaling agent for adjusting a number of application instances in the plurality of application instances; and at least one processor executing a method for optimizing processing across a plurality of resources, the method comprising:

receiving a process data object comprising a plurality of processing steps;

monitoring, using the one or more leader threads, a current processing load across the plurality of application instances;

assigning, using the one or more leader threads, a first processing task corresponding to a first step of the plurality of processing steps to a first processing thread based on the current processing load; and upon completion of the first processing task, assigning, using the one or more leader threads, a second processing task corresponding to a second step of the plurality of processing steps to a second processing thread based on the current processing load.

16. The system of claim 15, wherein the set of processing threads comprises one or more specialized processing threads corresponding to a specific type of processing step within the plurality of processing steps.

17. The system of claim 16, further comprising:

determining a number of available specialized processing threads of the set of processing threads which are configured for the first processing task based on a type of the first step of the plurality of processing steps.

18. The system of claim 15, further comprising:

responsive to assigning the first processing task to the first processing thread, storing a unique processing thread identifier associated with the first processing thread along with a set of data relating to the process data object in the persistence data store.

19. The system of claim 15, wherein a number of application instances in the plurality of application instances is elastic such that application instances may be added or removed.

20. The system of claim 19, further comprising:

transmitting a scaling request to the scaling agent requesting scaling of a number of application instances in the plurality of application instances based on the processing load.

* * * * *